United States Patent Office 3,367,925
Patented Feb. 6, 1968

3,367,925
POLYMERIZATION OF SYMMETRICAL DICHLOROETHYLENE
Gordon Y. T. Liu, Plaquemine, La., and Coleman J. Bryan, Arlington, Va., assignors to The Dow Chemical Company, Midland, Mich., a corporation of Delaware
No Drawing. Filed Jan. 27, 1964, Ser. No. 340,512
6 Claims. (Cl. 260—91.7)

ABSTRACT OF THE DISCLOSURE

This invention relates to solid, high-melting polymers of symmetrical dichloroethylene and to a method for preparing the same using especially effective complex Ziegler-type catalysts formed by reacting (1) a compound of a metal of Groups II-B, IV-A, IV-B, V-B, VI-B, VII-B and VIII (including thorium and uranium) of the periodic system, (2) an organometallic compound of an alkali metal, an alkaline earth metal, zinc or aluminum, and (3) a complexing agent for the organometallic compound.

---

It is known that symmetrical dichloroethylene may be polymerized (or copolymerized with one or more of the monomers of other copolymerizable materials, such as vinyl chloride and vinyl esters and the like) in bulk, solution, suspension or emulsion polymerization systems using free radical type catalysts, as, for example, peroxides such as benzoyl peroxide and persulfate, and with and without the presence of: ultraviolet light, ionizing radiation such as that obtained using cobalt 60, and/or high pressures. However, even when using such catalysts and/or high pressures, the polymerization often occurs sluggishly and long periods of time are required in order to obtain commercially practical yields of polymer. Also, the polymers obtained heretofore frequently are characterized by an undesirably low molecular weight and are generally extremely sensitive to the deleterious effects of heat. Moreover, bulk polymerization using free radical initiators is often difficultly controlled and may produce highly undesirable chain reactions.

Accordingly, it is an object of the present invention to provide solid, high melting polymers of symmetrical dichloroethylene which are characterized by enhanced stability to heat.

Another object is to provide a process for preparing such polymeric materials in the presence of relatively small amounts of certain catalysts which are especially effective for promoting polymerization.

Other and related objects will become apparent from the following specification and claims.

In accordance with the present invention, the improved polymers of symmetrical dichloroethylene are prepared by contacting cis or trans symmetrical dichloroethylene with a catalyst formed by reacting (1) a compound of a metal of Groups II-B, IV-A, IV-B, V-B, VI-B, VII-B and VIII (including thorium and uranium) of the Periodic System, (2) an organo metallic compound of an alkali metal, an alkaline-earth metal, zinc or aluminum, and (3) a complexing agent for the organometallic compound, as hereinafter defined; wherein the metal constituent of (1) is present in amounts of at least about 1 p.p.m. and preferably less than about 1000 p.p.m. and preferably between about 25 and 400 p.p.m., based on the weight of the liquid monomeric material; and wherein the organometallic compound (2) is present in amounts between about 0.5 and 15 moles per mole of (1); and further wherein the complexing agent (3) is present in amounts between about 0.2 and 30 moles per mole of (1).

In a further embodiment of the present invention it has been found that the herein defined symmetrical dichloroethylene polymers may advantageously be prepared by contacting the liquid monomeric materials with a catalyst formed by: (A) admixing a compound of a metal of Groups II-B, IV-A, IV-B, V-B, VI-B, VII-B or VIII (including thorium and uranium) with the hereinafter defined complexing agent for the organometallic component of the catalyst system, and (B) subsequently adding the required amounts of the organometallic compound. The polymerization is then accomplished under autogenous pressure at a temperature between about 10 and 150° C.

In the preparation of the improved symmetrical dichloroethylene polymers in accordance with the present invention, any inorganic or organic salt or complex of the metals of Groups II-B, IV-A, IV-B, V-B, VI-B, VII-B or VIII (including thorium and uranium) of the Periodic Table of Deming, "Fundamental Chemistry," second edition, published 1952 by John Wiley and Sons, Inc., New York, may be used. Thus, any compound of cadmium, zinc, tin, lead, titanium, zirconium, hafnium, thorium, vanadium, tantalum, chromium, molybdenum, tungsten, uranium, manganese, rhenium, iron or cobalt may be used. As purely exemplary of such compounds are cadmium chloride, zinc chloride, lead nitrate, titanium tetrachloride, zirconium tetrachloride, titanium trichloride, vanadium dichloride, bis(cyclopentadiethyl)titanium dichloride, vanadium trichloride, vanadium tetrachloride, vanadium trifluoride, vanadium oxytrichloride, vanadium oxydichloride, tantalum pentachloride, molybdenum trichloride, molybdenum pentachloride, chromium dichloride, chromium trichloride, ferric chloride, manganese dichloride, vanadium trioxide, vanadium pentoxide, chromium oxide, vanadium oxyacetylacetonate, chromium acetylacetonate, cobalt acetylacetonate, iron acetylacetonate, manganese acetylacetonate, alkyl vanadates, alkyl titanates, among many others.

The above described compounds of metals of Groups II-B, IV-A, IV-B, V-B, VI-B, VII-B and VIII (including thorium and uranium) are used in amounts sufficient to provide at least about 1 p.p.m., and preferably less than 1000 p.p.m. of the indicated metal constituent of such compound, based on the weight of the hereinbefore defined monomeric material. More particularly, such compounds are generally economically and advantageously used in amounts sufficient to provide between about 25 and 400 p.p.m. of the metal constituent of such compound, based on the weight of the monomeric material. It has been found that catalyst systems containing less than about 1 p.p.m. of such metals, when used in conjunction with the total catalyst system as defined herein, do not effectively produce polymer, particularly if the materials to be polymerized are not substantially dry prior to mixture therewith. It has further been found that concentrations of the metal constituent of the above-defined compounds in excess of about 1000 p.p.m., based on the weight of the monomeric materials, tend to produce polymer which is often dark and which is difficulty separated from residual undesirable catalyst materials.

The organometallic constituent of the catalyst may be any organometallic compound of a metal of Groups I, II, or III of he Periodic System, i.e., an alkali metal, alkaline-earth metal, zinc, or aluminum, may be used. Exemplary of such organometallic compounds are the alkali metal alkyls or aryls such as amylsodium, phenylsodium, etc., dimethyl magnesium, diethyl magnesium, diethyl zinc, butyl magnesium chloride, ethyl magnesium chloride, phenyl magnesium bromide, trimethylaluminum, triethylaluminum, tripropylaluminum, tributyl aluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diisobutylaluminum chloride, diethylaluminum hydride, ethylaluminum hydride, diisobutylaluminum hydride, etc., and complexes of such organometallic compounds, as for example, sodium aluminum tetraethyl, lithium aluminum triethyl butyl, lithium aluminum trioctyl butyl, lithium aluminum tetraoctyl, sodium aluminum triethyl chloride, etc.

As previously stated, the molar ratios of the organometallic compound to the metals of Groups II–B, IV–A, IV–B, V–B, VI–B, VII–B or VIII of the Periodic System may be varied between about 0.5 and 15 moles of the herein defined organometallic compound per mole of the above-identified compounds of the metals of Groups II–B through VII–B and VIII. Molar ratios less than those stated herein are generally not sufficient for reaction and molar ratios in excess of those stated herein often result in a disadvantageously slow rate of polymerization.

Suitable complexing agents, which are believed to function as electron donors to form chelate-type complexes with the organometallic compound, are ethers, alkylene oxides, tertiary amines, esters, ketones and nitro aromatics. Exemplary of the complexing agents that have been found to be particularly effective are: diethyl ether, tetrahydrofuran, 2-methyltetrahydrofuran, triethylamine, ethylene oxide, and ethyl acetate. Just what may be the function of the complexing agent is not completely understood but it is believed that it forms a complex with the organometallic compound to prevent undesirable side reactions which might otherwise take place between the organometallic compound and the monomer or polymer. As stated herein the molar ratios of the complexing agent to the compounds of the metals of Groups II–B, IV–A, IV–B, V–B, VI–B, VII–B and VIII of the Periodic System may be varied between about 0.2 and 30 moles of such complexing agent per mole of the indicated compounds. Molar ratios less than those defined herein are generally insufficient for polymerization and molar ratios in excess of those stated herein are unnecessary and may substantially retard polymerization rates. It has further been found that the utilization of ethylene oxide as the complexing agent, either alone or in combination with one or more of the other complexing agents as herein described, often significantly increases the molecular weight of the polymeric materials of the present invention, and/or the rate of polymerization of the required monomeric materials.

As hereinbefore stated, the polymerization may be accomplished in any of a number of ways using either batch or continuous operations, and further by utilizing various techniques for contacting the indicated monomeric materials with the components of the catalyst system prior to polymerization.

It is pointed out, however, that although the catalyst may be formed by the conventional practice of introducing the catalyst components simultaneously or in increments into the polymerization system, enhanced rates of polymerization are often obtained if the polymerization is conducted in such a manner as to provide for the contact of the compound of a metal of Groups II–B, IV–A, IV–B, V–B, VII–B and VIII (including thorium and uranium) and the herein defined organometallic constituent, only immediately prior to polymerization. Further, it is necessary that the herein defined complexing agent is added in a manner sufficient to prevent extensive reaction between the hereinbefore described organometallic constituent of the catalyst system with monomeric or polymeric material.

One such preferred polymerization technique utilizes the following sequential series of steps:

(A) admixture of the herein defined compound of a metal of Groups II–B, IV–A, IV–B, V–B, VI–B, VII–B and VIII (including thorium and uranium) with the indicated complex agent (in the amounts specified herein), (B) subsequently adding the required amounts of the organometallic constituent, and (C) reacting such catalyst with the monomeric materials under autogenous pressures at a temperature between about 10 and 150° C.

The selection of the temperature used for the polymerization process will obviously depend upon the activity of the catalyst system being used and the degree of polymerization desired. In general, the polymerization will be carried out at temperatures between about 10° C. and 150° C., and preferably between about 30° C. and 70° C. Below about 10° C. polymerization virtually ceases, whereas temperatures above about 150° C. often significantly degrade the so-formed polymeric material. In the same way, while autogenous pressures are generally used, the polymerization may be carried out under a wide range of pressures, as for example, from a partial vacuum up to as much as about 1000 pounds. Higher pressures may, of course, be used but generally do not appreciably alter the course of the polymerization.

Further, it has been found that the polymerization may be carried out with or without the use of added diluent or solvent; however, it is often advantageous to employ conventionally used diluents such as isooctane and the like to retard reactor fouling (i.e. polymer or copolymer build-up on the reactor walls), and for ease in the handling and mixing of the herein described components of the catalyst system.

It has also been found that best results are obtained if essentially all water (i.e. less than about 50 p.p.m. of water based on the total composition weight) and traces of iron are removed from the herein defined monomeric materials prior to polymerization, as such impurities often tend to seriously retard the polymerization rates and have an adverse effect on the thermal stability of the desired polymeric materials.

It has further been found that the presence of conventionally used polymerization inhibitors, i.e. phenol and methyl ethyl hydroquinone, and the like, in the monomer constituents have little or no effect on polymerization rates unless present in amounts greater than about 200 p.p.m., based on the weight of the monomer.

The improved symmetrical dichloroethylene homopolymers produced in accordance with the present invention are solid, high melting, easily processible polymeric materials having significantly improved resistance to heat. Hence, such polymers have a wide range of application as coatings, film, flexible articles such as floor covering, and rigid and semi-rigid articles such as pipe and bottles, among many other uses, and are particularly suitable for use in extrusion and coating applications. It is to be recognized, however, that added stability or processibility may be obtained by the addition to such polymers of conventionally used additives including plasticizers and/or heat and light stabilizers.

The following examples, wherein all parts and percentages are to be taken by weight, illustrate the present invention but are not to be construed as limiting its scope.

*Example 1*

100 parts by weight trans-1,2-dichloroethylene having a boiling point of 47–48° C. were sealed under nitrogen in a dry, glass bottle containing titanium tetrachloride in amounts sufficient to provide 220 p.p.m. titanium based on the weight of monomer; diethyl aluminum chloride in amount sufficient to provide 960 p.p.m. of aluminum based on the weight of the monomer; and 170 p.p.m. of tetrahydrofuran based on the weight of the monomer. The mixture was then capped and shaken to insure uniform mixing and subsequently reacted for a period of 65 hours at 50° C. in a constant temperature polymerization bath. At the end of the reaction period, the bottle was opened, allowed to cool and the polymeric material was washed with methanol and subsequently dried. The recovered polymeric product was a fine white powder having a melting point of 220° C. This polymer did not discolor or otherwise decompose when subjected to temperatures of about 250° C.

*Example 2*

100 parts by weight of cis-1,2-dichloroethylene having a boiling point of 60–61° C. were sealed under nitrogen in a dry glass bottle containing titanium tetrachloride in amounts sufficient to provide 690 p.p.m. titanium based on the weight of monomer; diethyl aluminum chloride in amount sufficient to provide 3,000 p.p.m. aluminum, based on the weight of monomer, and 480 p.p.m. of tetrahydrofuran based on the weight of the monomer. The mixture was then capped and shaken to insure uniform mixing and reacted for a period of 17 hours at 50° C. in a constant temperature polymerization bath. The so-formed polymeric material was isolated as described in Example 1 and was found to be a fine white powder having a melting point of 200° C. This material did not discolor or otherwise decompose when subjected to temperatures of about 220° C.

*Example 3*

100 parts by weight of trans-1,2-dichloroethylene having a boiling point of 47–48° C. were sealed under nitrogen in a dry glass bottle containing 240 p.p.m. vanadium as vanadium tetrachloride, 600 p.p.m. aluminum as triethyl aluminum and 170 p.p.m. tetrahydrofuran, the concentrations of such catalyst components being based on the weight of the monomer. The mixture was then reacted for 21 hours at 60° C., cooled, washed with methanol and dried to yield a fine white powder having a melting point of 150° C. This material did not discolor or otherwise decompose when subjected to temperatures of about 180° C.

What is claimed is:
1. In a method of preparing solid, high melting, heat-resistant polymers of symmetrical dichloroethylene the steps comprising:
 (I) contacting monomeric symmetrical dichloroethylene at a temperature between about 10° C. and 150° C. under autogeneous pressure with a catalyst formed by reacting:
  (1) a compound of a metal selected from the group consisting of metals of the Groups II–B, IV–A, IV–B, V–B, VI–B, VII–B and VIII of the Periodic System with
  (2) an organometallic compound of a metal selected from the group consisting of an alkali metal, an alkaline-earth metal, zinc and aluminum, and
  (3) a complexing agent for said organometallic compound, wherein the metal constituent of (1) is present in amounts of at least about 1 p.p.m. based on the weight of said liquid monomeric material; wherein (2) is present in amounts between about 0.5 and 15 moles per mole of (1); and wherein (3) is present in amounts between about 0.2 and 30 moles per mole of (1), and
 (II) recovering said polymer.
2. The method of claim 1, wherein said monomeric symmetrical dichloroethylene is polymerized in the absence of additional solvents and diluents.
3. The method of claim 1, wherein (1) is a titanium compound and (2) is an organoaluminum compound and (3) is selected from the group consisting of tetrahydrofuran and mixtures of tetrahydrofuran and ethylene oxide.
4. The method of claim 3, wherein (1) is titanium tetrachloride and (2) is diethyl aluminum chloride.
5. The method of claim 1, wherein (1) is a vanadium compound, (2) is an organoaluminum compound and (3) is tetrahydrofuran.
6. The method of claim 5, wherein (1) is vanadium tetrachloride and (2) is triethyl aluminum.

References Cited

FOREIGN PATENTS

| | | |
|---|---|---|
| 834,937 | 5/1960 | Great Britain. |
| 950,769 | 2/1964 | Great Britain. |
| 897,009 | 3/1964 | France. |

OTHER REFERENCES

Weale, K. E., Liquid-Phase Reactions, at High Pressures, part VII, The Polymerization of 1:2-Dichloroethylene, in Chemical Society Journal, part 2, pp. 2223–2224, 1952 QD 1C6.

JOSEPH L. SCHOFER, *Primary Examiner.*

J. A. DONAHUE, *Assistant Examiner.*